United States Patent [19]
Wu

[11] Patent Number: 5,606,439
[45] Date of Patent: Feb. 25, 1997

[54] TUNABLE ADD/DROP OPTICAL FILTER

[75] Inventor: Kuang-Yi Wu, Boulder, Colo.

[73] Assignee: Macro-Vision Technology, Inc., Boulder, Colo.

[21] Appl. No.: 629,523

[22] Filed: Apr. 10, 1996

[51] Int. Cl.$^6$ ............... G02F 1/1335; G02B 6/12; G02B 6/26
[52] U.S. Cl. ............... 349/117; 385/14; 385/31; 385/39
[58] Field of Search ............... 359/73, 63; 385/11, 385/14, 31, 39, 15, 20

[56] References Cited

U.S. PATENT DOCUMENTS

| | | | |
|---|---|---|---|
| 5,132,826 | 7/1992 | Johnson et al. | 359/73 |
| 5,231,521 | 7/1993 | Johnson et al. | 359/73 |
| 5,243,455 | 9/1993 | Johnson et al. | 359/73 |
| 5,245,451 | 9/1993 | Wu et al. | 359/73 |
| 5,303,314 | 4/1994 | Duling, III, et al. | 385/11 |
| 5,450,427 | 9/1995 | Fermann et al. | 378/18 |
| 5,469,455 | 11/1995 | Reitz et al. | 372/20 |
| 5,481,402 | 1/1996 | Cheng et al. | 385/11 |
| 5,488,679 | 1/1996 | Wu | 385/15 |
| 5,513,194 | 4/1996 | Tamura et al. | 372/6 |

Primary Examiner—William L. Sikes
Assistant Examiner—Tsep H. Nguyen

[57] ABSTRACT

In all-optical networks, optical switching and routing become the most important issues for interconnecting the transport network layers. This invention describes a novel tunable optical add/drop filter for the all-optical wavelength-division-multiplexing (WDM) network applications. This filter can add or drop part of the high transmission capacity signals of a WDM link. It can be used to decentralized access point in the access network or as small core network node to realizing branching points in the network topology. It works in both wavelength and space domains. It has the advantages of: 1) High throughput and low voltage operation; 2) Wide tuning range and therefore, high channel capacity; 3) High isolation and high directivity between input and output ports; 4) Compact device packaging is possible as compares to the conventional grating and mechanical switching type of add/drop filter; 5) Multiple ports add/drop tunable filters can be realized with this invention to interconnect multiple WDM networks. This novel add/drop filter can be used in various WDM topologies. It enhances the performance of the conventional tunable filter by re-routing the rejected wavelengths back to network, which not only save the precious optical energy, but also cut down the return loss of the device.

3 Claims, 6 Drawing Sheets

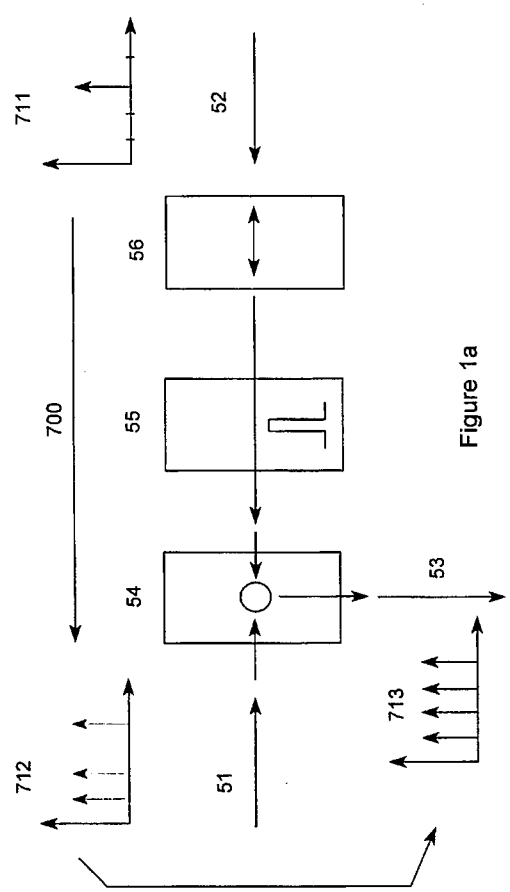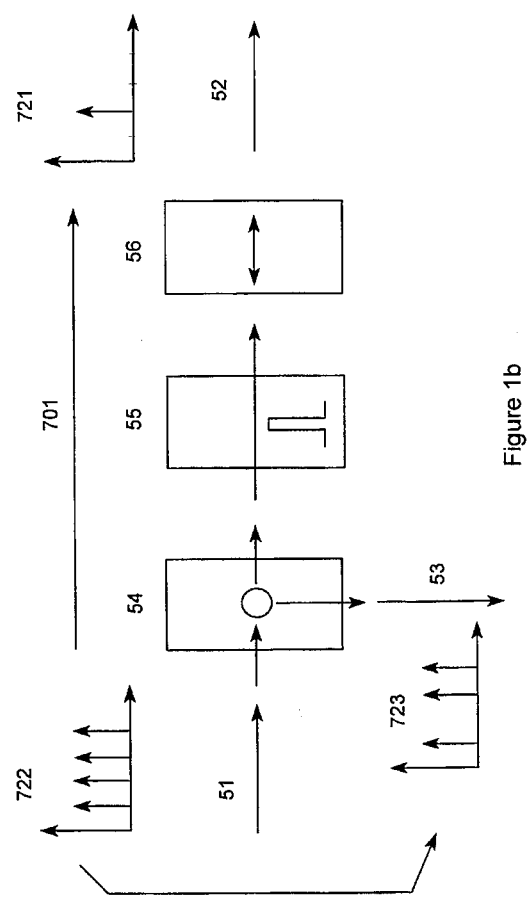

TUNABLE ADD/DROP OPTICAL FILTER

FIELD OF THE INVENTION

In this invention, a tunable optical add/drop filter for the wavelength-division-multiplexing (WDM) network applications is described. This filter can add or drop part of the high transmission capacity signals of a WDM link.

BACKGROUND OF THE INVENTION

The communication environment is evolving towards increasingly heterogeneous but interconnected networks. The growth of demand for existing services and the introduction of new advanced services is expected to create a large increase of traffic flow in the near future. The current evolution of telecommunication network is led by asynchronous and synchronous transfer modes (Asynchronous Transfer Mode(ATM), Synchronous Optical Network (SONET), Synchronous Digital Hierarchy (SDH)), which require primarily electronic technologies for processing and switching. Although the necessary hardware building blocks are available to design wide area networks, complex issue arises with the management of network resources. In order to simplify the transfer task, the layer structure of the transport network and the use of optical means are preferred.

In all-optical networks, optical switching and routing become the most important issues for interconnecting the transport network layers. This invention describes a tunable optical add/drop filter for the optical WDM network applications. This filter can add or drop part of the high transmission capacity signals of a WDM link. It can be used to decentralized access point in the access network or as small core network node to realizing branching points in the network topology. It works in both wavelength and space domains.

The following describes various device structures that have been used for the add/drop filter design. The first structure [Cheung, "Acoustoopic Tunable Filters in Narrowband WDM networks: System Issues and Network Applications," IEEE J. Sele. Area Comm. 8(6), 1015, 1990.] uses four 1×N demultiplexers and N's 2×2 optical switches. The structure is complicated and the interconnections are difficult.

The second tunable add/drop filter, similar to the first geometry, has recently been proposed and demonstrated by Glance at AT&T. [Glance, "Tunable add/drop optical filter providing arbitrary channel arrangement", IEEE Photon. Lett., 7(11), 1303, 1995 and U.S. Pat. No. 5,488,500.] This filter provides the advantage of arbitrary channel arrangement, but still suffers a costly 6 dB optical coupling loss, because of the two array waveguide grating demultiplexers used in the structure.

The third type of wavelength-space switch [Dono et al, "A wavelength division multiple access network for computer communication", IEEE J. Sol. Area Comm., 8(6), 983, 1990.] has been widely used in various WDM networks, for example the IBM Rainbow Network. This structure uses a passive star-coupler that combines and splits the incoming light signals into N receivers. The receivers built with a tunable filter then select the desired channels. It has the broadcast capability and the control structure of this implementation is very simple. However, the undesirable feature of the broadcast star, the splitting loss can be very high when the users number is large.

The add/drop filter presented in this invention can re-route the unused channels, which are rejected by the tunable filter, back to the network and save the precious optical energy in the network. It includes the design of an optical isolator, that also dramatically cuts down the return loss of the device, another important performance requirement for high-speed WDM devices. It operates in both wavelength and space domains that provides hybrid functionality with a relatively simple structure. It is ideal for the WDM applications.

DESCRIPTION OF THE DRAWINGS

FIGS. 1a, 1b are the building blocks of a tunable add/drop optical filter of this invention. It consists of three primary parts of non-reciprocal optical setup, tunable filter, and reciprocal optical setup.

SUMMARY DESCRIPTION OF THE INVENTION

Figure 2:
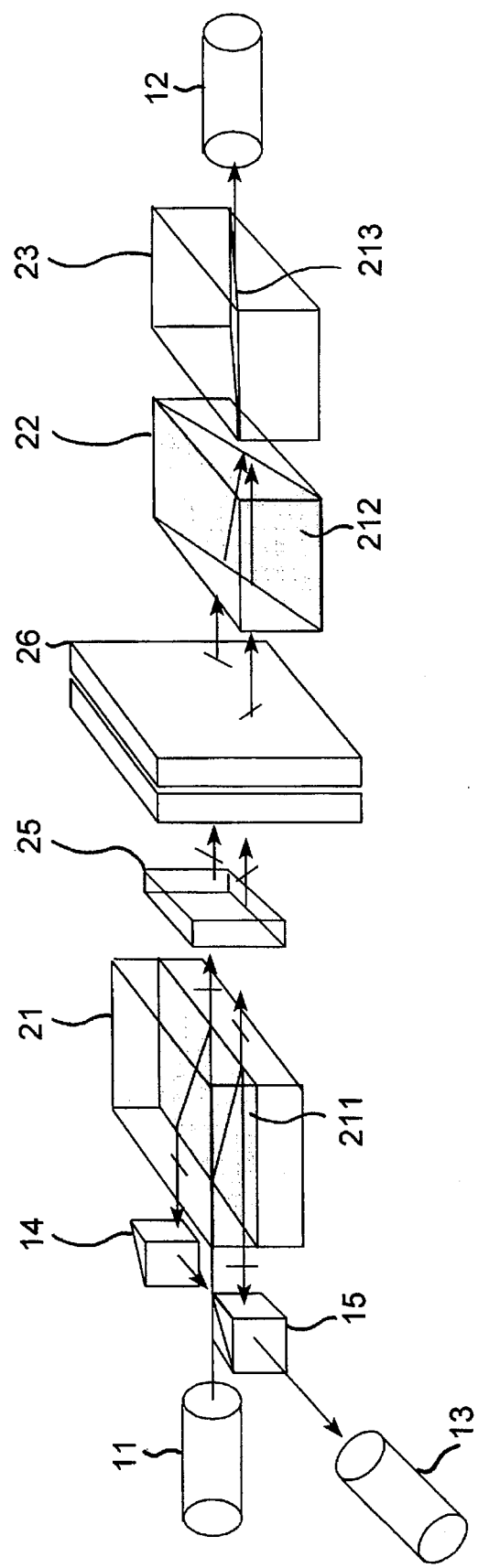
FIG. 2 is a schematic representation of an exemplary tunable add/drop filter of this invention.

The present invention includes a tunable add/drop filter that utilizes the unique operational characteristics of a non-reciprocal optical setup and a reciprocal optical setup for wavelength re-routing, and a tunable filter for wavelength selection. The non-reciprocal optical setup provides the functionality for optical channels to go in and out of the filter with high isolation. The reciprocal optical setup is used to keep the light wave paths stay the same during the add/drop operations. In between the two optical setups, a filter is inserted to select the desired channels that pass through the add/drop filter.

In exemplary embodiments of the present invention, Fabry-Perot type filters and polarization interference filters are used. The non-reciprocal optical setup may comprise of a Faraday Rotator, a birefringent element, a polarizing beam combiner, and a right angle prism. The reciprocal optical setup may comprises of a pair of birefringent elements with their polarization eigen plane orthogonal to each other and are ±45° to that of the birefringent element in the non-reciprocal setup, respectively. To properly recombine the two orthogonally polarized light waves at the add/drop port the thickness of the two birefringent elements in the reciprocal setup is $1/\sqrt{2}$ of the birefringent element in the non-reciprocal setup.

Other features and embodiments of the present invention will become clear to those of ordinary skill in the art by reference to the drawings and accompanying detailed description.

DESCRIPTION OF THE PREFERRED EMBODIMENT

The core of this tunable add/drop filter composes of a tunable filter 55, a non-reciprocal optical return setup 54, and a reciprocal optical setup 56, as shown in FIG. 1. The spectra changed in the filter can be understood from 700 and 701 for the adding and dropping operations, respectively. In 700 adding operation (FIG. 1a), the channel (wavelength) to be added into the WDM network is in 711 and enters from 52. It combines with the spectrum 712, which already exists in the network, and exit at 53 with a combined spectrum 713. In dropping operation 701 (FIG. 1b), the network spectrum is 722. It drops part of the spectrum 721 to 52. The rest of the returned channels then re-routes through 53 and go back to the network with a spectrum 723.

The light wave propagates within the add/drop filter can be further explained as follow. In the dropping operation, the incoming network signals carry multiple wavelengths enter from port 51. The non-reciprocal optical setup 54 passes spectrum 722 to the tunable filter 55. The selected channel 721 passes through the filter and the reciprocal setup 56, and exit at port 52. The rejected channels by the tunable filter, on the other hand, reflects back to the non-reciprocal setup 54. Because of the non-reciprocal property of 54, light propagates backward in a different path as in the forward propagating direction. Therefore, it exits at port 53 and completes the dropping operation.

For the added operation, optical signal 711 to be added into the network enters from port 52. Because the reciprocal setup of 56, light traveling in the reverse direction follows exactly the same path as it did in the forward direction. Therefore, spectrum 711 passes through the filter 55 that has been tuned to the channel and enters the non-reciprocal setup 54. Because of the non-reciprocal optical path arrangement, this added channel joins the rest of the rejected channels by the filter in the backward propagating direction and exits at port 53. This completes the adding operations.

A preferred structure of this invention is shown in FIG. 2. The non-reciprocal setup is built by a combination of a Faraday rotator 25, a birefringent element 21, a polarization beam combiner 15, and a right angle prism 14. The optical reciprocal setup is comprised of a pair of birefringent elements 22/23 with their polarization eigen planes 212/213 perpendicular to each other, and are ±45° relative to the polarization eigen plane 211 of the birefringent element in the non-reciprocal setup. The polarization eigen plane is defined by the plane that contains the optical axis of the birefringent element and also is the plane contains the two orthogonal polarization states, when an unpolarized light is incident onto the element. The add/drop channel is selected by the tunable filter 26. The add/drop port is designated by 12. The input and output ports to the WDM network are 11 and 13.

Figure 3A:
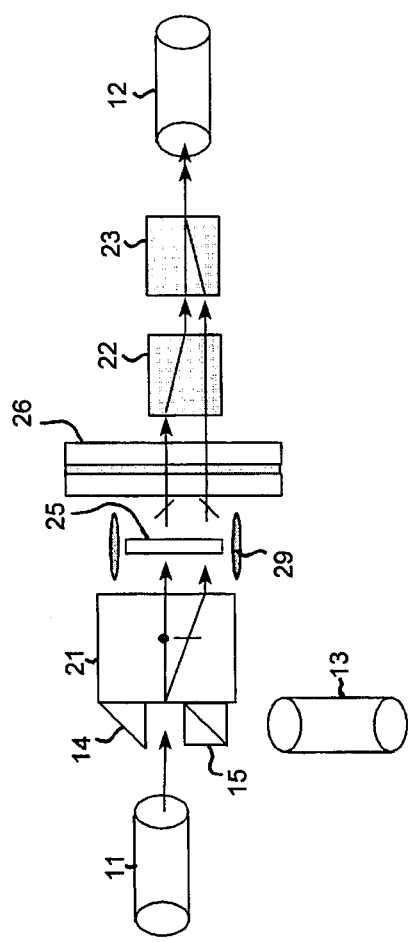
FIGS. 3a, 3b are schemes illustrating the operation of a tunable add/drop filter of this invention. The polarization states progressing through the optical elements is indicated and the definition of the signs are shown in the insert.

The detailed operations of the add/drop tunable filter are shown in FIG. 3, which is the top view of the device. The polarization progression within the filter is also indicated. In FIG. 3a, the forward dropping operation is realized by splitting the input polarization into two eigen orthogonal polarizations using the birefringent element 21. These two light beams with polarization at (0°, 90°) are then rotated another 45° by the Faraday Rotator 25 sits inside a magnet 29 and incident onto the filter 26. The dropping channel passes through tunable filter 26 where it has been tuned to the desired resonant condition. The two spatially separated signals are recombined by the second and third birefringent element 22 and 23 oriented at ±45° and collected by the output lens 12. Since the thickness of 22 and 23 is chosen to be only $1/\sqrt{2}$ of the first birefringent element 21, the two polarizations can be combined into a single beam by orientating 23 at 90° with respect to 22. This arrangement of beam displacement allows any incoming state of polarization to be efficiently transmitted through the add/drop filter in the forward direction.

Figure 3B:
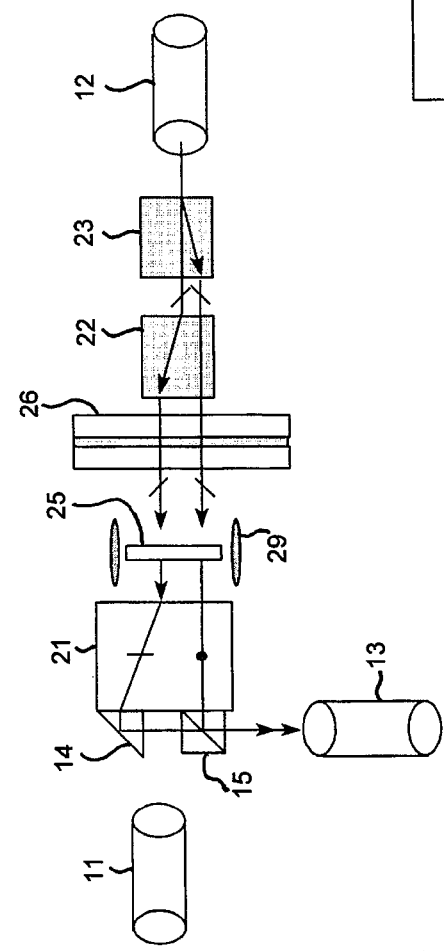

For the channels (wavelengths) that are rejected by the tunable filter 26, they backward propagate to 25 and are rotated another 45°. Because this is a non-reciprocal effect, the returned polarizations are in (90°, 0°) states and are orthogonal to their original input states. Hence, they travel at different paths when passing through 21, as shown in FIG. 3b. These two light beams are recombined by the right angle prism 14 and the polarization beam combiner 15 and send back to the WDM network.

Similarly, the added operation can be traced as shown in FIG. 3b. The light signal to be added into the WDM network first splits its polarization by 22 and 23 combination with polarization angles of (+45°, −45°). This is based on the fact that the input and output of the combined elements (22 and 23) are reciprocal. This means that light traveling in the reverse direction (i.e. the adding operation) must follow exactly the same path as it does in the forward direction. Therefore, at the exit of this combined birefringent elements (22/23), the spatial walk-off and the polarizations are identical for both forward and backward traveling light waves. With filter 26 tuned to the added wavelength, light signal passes the filter and enters 25. By adding another 45° polarization to its original state, the output polarizations become (90°, 0°), which are the same as the rejected wavelengths. They are then collected by the prism 14 and polarization combiner 15 and go into the WDM network as was explained above. This completes the add/drop operations.

The elements used in this invention are listed below for illustration. These shall not limit to the application. The Faraday rotator can be those based on magneto-optic materials, for examples, yttrium iron garnet (YIG), bismuth-substituted rare earth iron garnet (RBiIG), and holmium and terbium doped garnet crystals (HoTbBi)IG. The filter in this invention can be, piezo-tuned Fabry-Perot optical filters, liquid-crystal based Fabry-Perot tunable filters (U.S. Pat. No. 5,111,321, by Patel), tunable polarization interference filters (A. Title, Tunable birefringent filters, Optical Engineering, Vol. 20, pp. 815, 1981.), and acoustooptic tunable filters (X. Wang, Acousto-optic tunable filters spectrally modulate light, Laser Focus World, May 1993.). When fixed filters, for example the interference filters, are used in this invention, they result in fixed add/drop filters. The polarizing materials used for the reciprocal operation can be materials with optical anisotropy, for examples calcite, rutile, lithium niobate ($LiNbO_3$), and yttrium orthovanadate $YVO_4$. All these Faraday rotators, filters, and polarizing crystals are commercially available.

EXAMPLE 1

Figure 4:
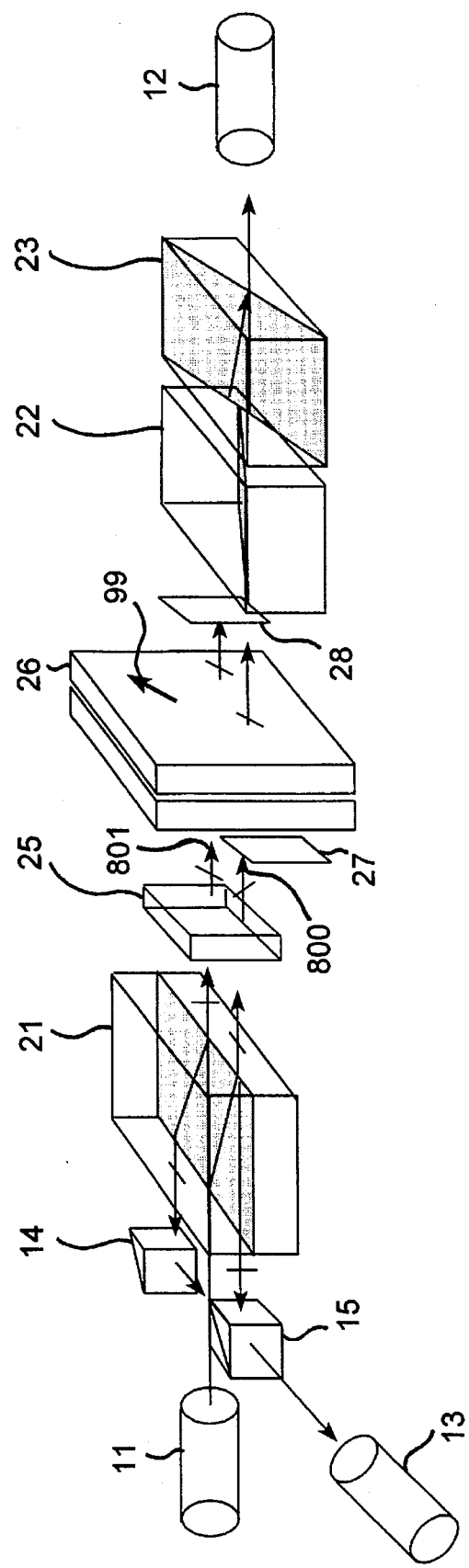
FIG. 4 is a structure representation of an exemplary tunable add/drop filter of this invention which incorporates a liquid crystal Fabry-Perot tunable filter. A pair of half waveplates are added into the two light paths, respectively, to rotate the polarizations match to the optical axis to the liquid crystal Fabry-Perot tunable filter.
Figure 5:
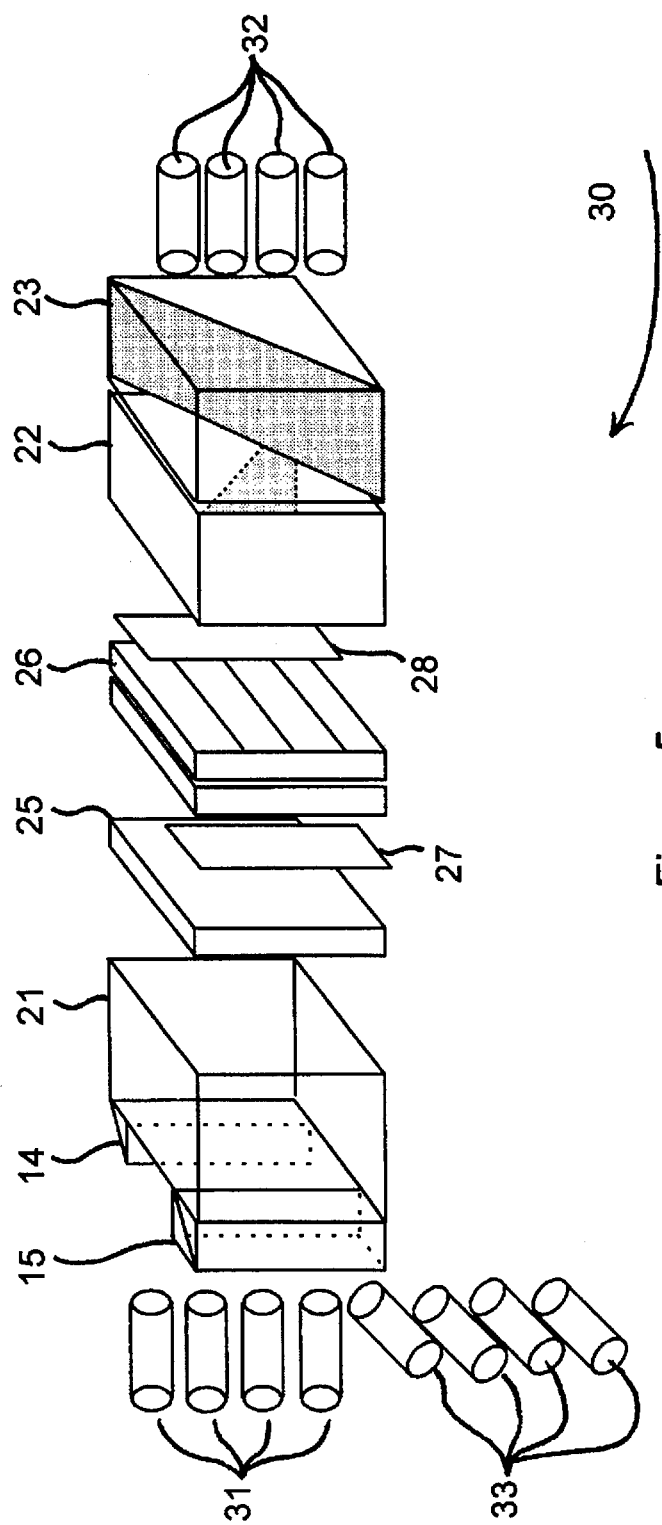
FIG. 5 is a schematic representation of a multi-port add/drop tunable filter. The input/output ports have multiple fibers that carry the optical signals from multiple WDM networks. Each add/drop layer can independently drop or add a desired optical frequency through the sectioned tunable filter.

An example of the tunable add/drop filter can be realized by using a liquid-crystal Fabry-Perot tunable filter as shown in FIG. 4. A pair of halfwave plates are inserted in front of and behind of the liquid crystal filter. A halfwave plate satisfies the equation $\Delta nd=\lambda/2$, where $\Delta n$ and d are the birefringence and thickness of the wave plate, and $\lambda$ is the light wavelength. The first wave plate 27 is added into the light path 800 to change the polarization of the decomposed input light to match the 45° optic axis of the filter 99. The second halfwave plate 28, which is placed on the opposite side of the filter, rotates the extra-ordinary light wave into ordinary in light paths 801. The two then recombines by the birefringent elements 22 and 23. The rest of the operations are explained in the previous embodiment Due to the spatial-light-modulation capability (2-Dimensional) of a liquid-crystal Fabry-Perot filter, a multiple-port add/drop tunable filter can be realized based on the current structure. As shown in FIG. 5, this multi-port add/drop tunable filter can be easily fabricated by patterning a liquid-crystal Fabry-Perot filter into sections, and spatially aligning a series of inputs and outputs ports together. Remember, this multi-port tunable add/drop filter has exactly the same number of birefringent elements, Faraday rotator, and filter as in the single-port design. The patterning of the liquid-crystal Fabry-Perot can also be achieved photolithographically on the controlling transparent indium-tin-oxide (ITO) electrodes. Therefore, costs saving on materials and a compact packaging are possible for this multi-port filter. Potential applications include, but not limit to, multiple WDM networks interconnections where simultaneously add/drop channels at this filter node can be achieved.

It can also combine with a N×N optical switch at the add/drop ports. In this case, multiple WDM networks are interconnected to each other and exchange information on this optical node. It operates in wavelength-space domain and is transparent to users and operators. This versatile filter will release the complex design of the high-capacity WDM network and decentralized access point in the access network or as small core network node to realizing branching points in the network topology.

EXAMPLE 2

When a fixed filter, for example the interference filter, is used in this invention a high throughput passive add/drop filter is realized. Here, the add/drop channel is pre-defined by the interference filter. However, only such a wavelength can go in and out of the ports.

EXAMPLE 3

Figures 6A, 6B:
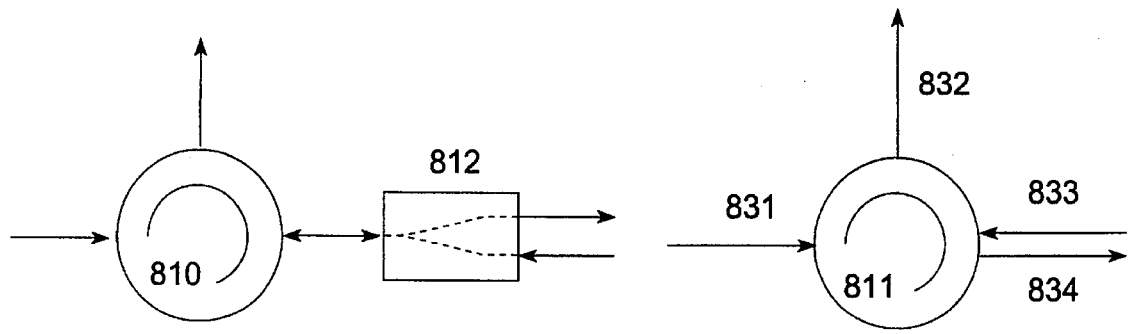
FIGS. 6a, 6b, 6c show optical switches combined with tunable add/drop filters to form tunable multiple-port add/drop filters.
Figure 6C:
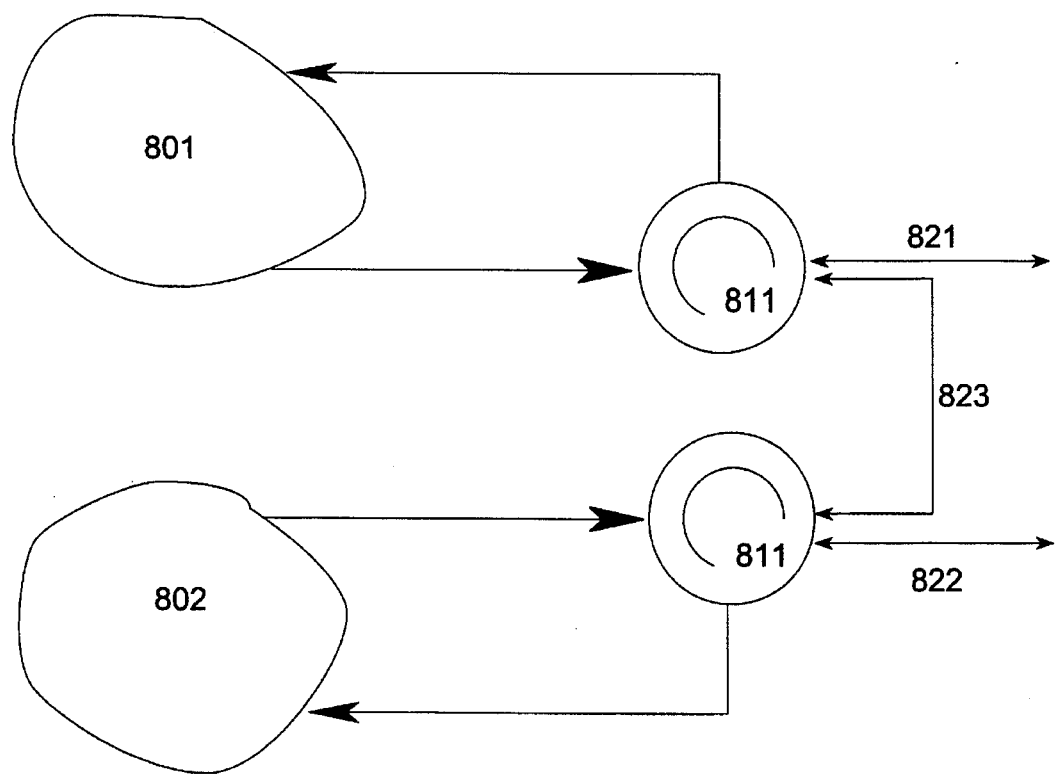

When an 1×2 optical switch is added onto the add/drop port, as shown in FIG. 6a, the three-port add/drop filter becomes a four-port add/drop filter with it's input- and output-port separated.(See FIG. 6b) Two of this add/drop filters 811 can be further interconnected to form a wavelength-space switching node for multi-layered WDM systems. In FIG. 6c, one of the add/drop port 823 of the add/drop filter 811 is linked to the each other. The channels between the two WDM systems 801 and 802 can then be shared through this interconnected optical node. Furthermore, because of the reciprocal nature of this add/drop filter at the add/drop port 821 and 822, optical channels can still be loaded up and down from the its WDM network 801 and 802, respectively. This greatly increase the flexibility design from the system's perspective.

THE ADVANTAGES OF THIS INVENTION

This tunable add/drop filter can be regarded as a combination of a tunable filter and an optical circulator. It has the merits of 1. High throughput because all of the optical energies are preserved by the re-routing characteristics of the add/drop operations.

2. Wide tuning range when liquid-crystal Fabry-Perot, piezoelectric Fabry-Perot, or acoustooptic tunable filter are used. Therefore, high channel capacity is obtainable.

3. High isolation and high directivity between input and output ports because of the use of Faraday rotator and birefringent materials.

4. Compact device packaging is possible, as compares to the conventional grating and mechanical switching type of add/drop filter.

5. When the tunable filter is a liquid-crystal Fabry-Perot type, multiple-port add/drop tunable filters can be realized by patterning the liquid-crystal Fabry-Perot filter into sections and spatially aligning an array of input and output fibers together. With the output ports connected to an N×N switch, a space-separated, wavelength-division demultiplexer can be realized. This multiple-port add/drop tunable filter can potentially be used to link multi-WDM networks without complicated electrooptic conversion at each networking node.

I claim:

1. A tunable add/drop filter which comprises: a non-reciprocal setup for optical channels return to WDM network, a tunable filter for predetermined optical channel selection, and a reciprocal optical add/drop setup for add/drop operations, where, the non-reciprocal optical setup is a combination of an optical birefringent element which has a thickness of d, a Faraday rotator that rotates eigen polarization of input light beams by 45°, a polarization beam combiner and a right angle prism placed at an entrance side of the birefringent element to recombine returned optical signals; the tunable filter for selectively dropping or adding the optical channels; and the reciprocal optical add/drop setup comprises of two optical birefringent elements with thickness of $(1/\sqrt{2})d$, and with their polarization eigen planes oriented at 45° and −45° relatively to a polarization eigen plane of the first birefringent element in the non-reciprocal setup, respectively.

2. The tunable add/drop filter of claim 1, wherein said tunable filter is a liquid crystal based, birefringent filter, a pair of halfwave plates are added to the front and back facets of the filter; said two halfwave plates are placed to intersect two orthogonally polarized incident light paths, respectively; a first one of the halfwave plates is placed on a first light path that rotates an ordinary light wave into extra-ordinary light wave that aligns a polarization of the light wave to an optical axis of the liquid crystal film; a second one of the halfwave plates is placed on a second light path that rotates the extra-ordinary light wave into ordinary light wave.

3. The tunable add/drop filter of claim 2, wherein said tunable birefringent filter is a patterned liquid crystal based filter with a plurality of sections; each filter section can selectively filter through optical channel and said tunable add/drop filter forms a tunable multiple-port add/drop filter.

* * * * *